March 13, 1945. J. H. HERRERA 2,371,328
STEAM GENERATOR FOR HEATERS AND INFUSION STRAINERS
Filed July 1, 1942 3 Sheets-Sheet 1

INVENTOR.
Juan Hernandez Herrera
BY Singer, Ehlert, Stern & Carlberg
ATTORNEYS

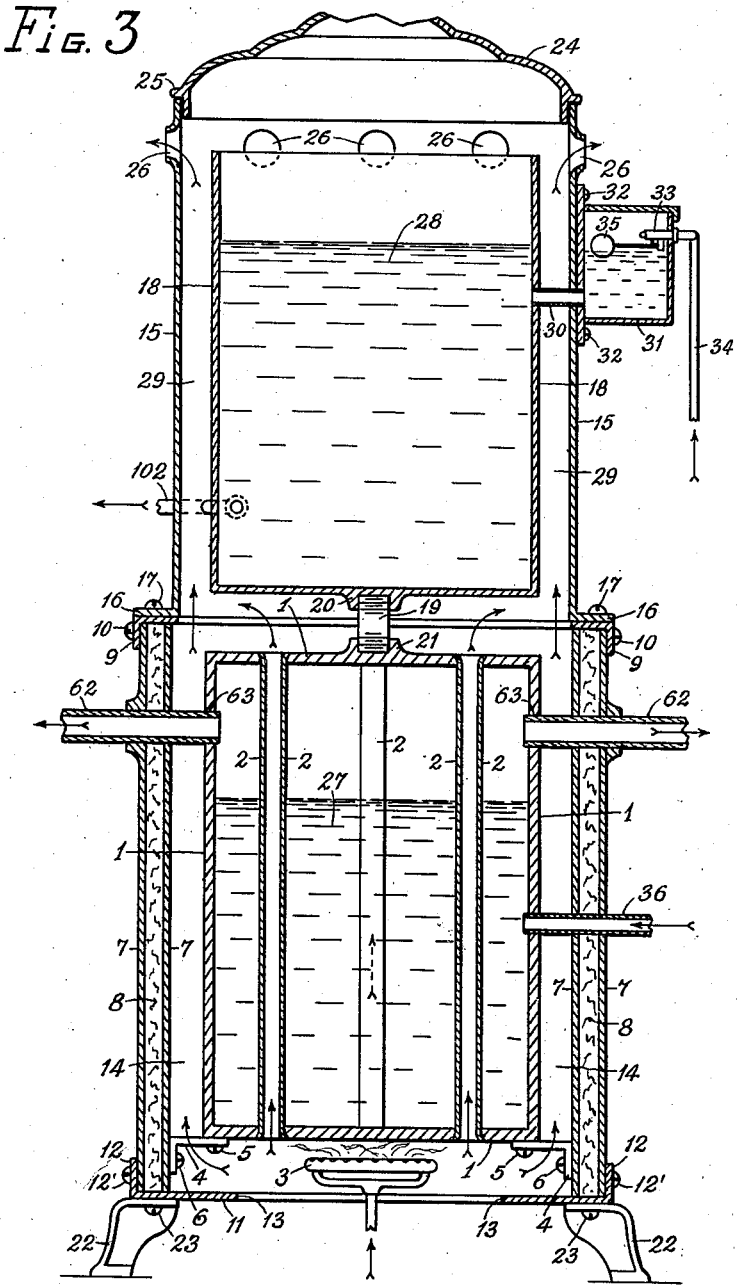

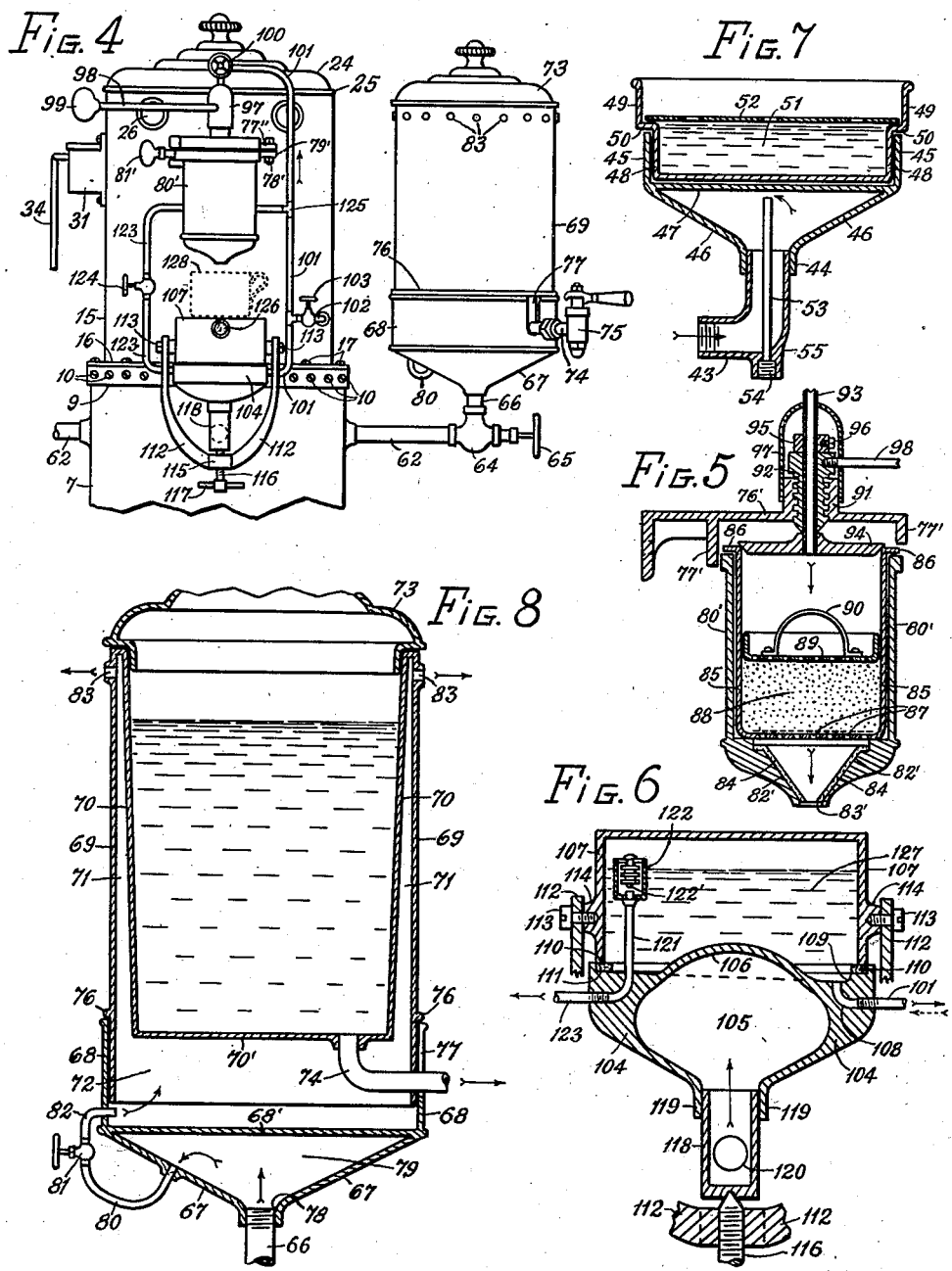

Patented Mar. 13, 1945

2,371,328

UNITED STATES PATENT OFFICE 2,371,328

STEAM GENERATOR FOR HEATERS AND INFUSION STRAINERS

Juan Hernandez Herrera, Habana, Cuba

Application July 1, 1942, Serial No. 449,232
In Cuba September 9, 1941

1 Claim. (Cl. 99—282)

This invention relates to steam generators for heaters and infusion strainers and for other general uses, and it has for its object to provide a steam generator for steam heaters, such as, for instance, bath heaters, milk heaters, coffee-pots, and particularly to quickly heat water for use in straining coffee instantaneously, as it is required for use at coffee-houses, hotels and similar public establishments.

At the present time much time is required for withdrawing from water heaters the amount of hot water necessary to strain the ground coffee contained in the usual strainer device and for manually pouring into the strainer the withdrawn amount of hot water. The present invention provides a pressure steam heater which automatically discharges into the strainer device the required amount of hot water in a very short period of time and without necessity of racking hot water by hand, said pressure steam heater being associated with the steam generator and with the strainer forming part of the system of apparatus comprised by this invention.

The invention is described with reference to the figures of the accompanying drawings, of which:

Fig. 3 is an enlarged diametral vertical section view of the steam generator and the water heater mounted above it, on line 3—3 of Fig. 2.

Fig. 4 is a partial elevational rear view of the steam generator and the heater mounted above it, clearly showing the assemblage of the strainer and of the pressure steam heater associated with same.

Fig. 5 is an enlarged diametral vertical section view of the strainer on line 5—5 of Fig. 2.

Fig. 6 is an enlarged diametral vertical section view of the pressure steam heater for the strainer device, on line 6—6 of Fig. 2.

Fig. 7 is a diametral vertical section view of a coffee-pot water bath on line 7—7 of Fig. 2; and Fig. 8 is a diametral vertical section view of a steam heater for milk or the like, on line 8—8 of Fig. 2.

Figure 1:
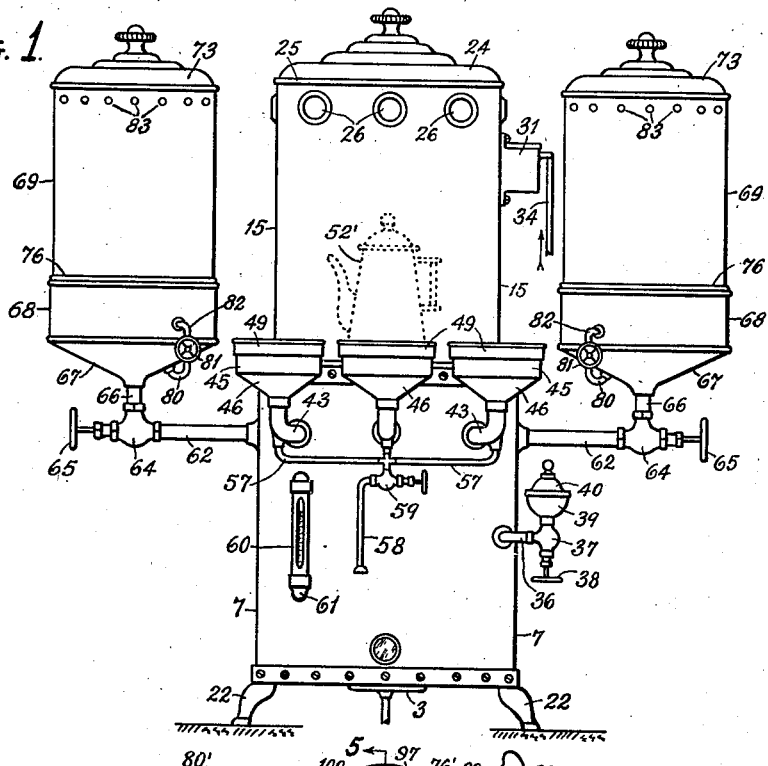
Fig. 1 is a front elevational view of the steam generator and heater devices forming the subject-matter of this invention.

In the drawings, 1 is a boiler or steam generator of the vertical flue type, the cylindrical body of which is closed above and below, and which contains a series of vertical tubes 2 in annular arrangement and adapted to lead upward the combustion gases from liquid fuel burner 3 mounted below the boiler 1. This construction is not described as it does not form a part of this invention. The boiler 1 is supported by two pairs of diametrally opposed angular plates 4 secured by screws 5 to the lower base of the boiler 1 and by screws 6 to the inner wall of a cylindrical body 7 concentrically spaced from the periphery of the boiler 1 and formed by a double wall enclosing an intermediate asbestos lining 8. The cylindrical body 7 is provided at its top with a ring of angular section 9 secured by screws 10 to the outer wall of the body 7 and the same is provided at its bottom with an annular disc 11 having a vertical flange 12 which is secured by screws 121 to the outer wall of the body 7. The area of its opening 13 is smaller than the lower base of the boiler 1 for the purpose of serving as a guide to the combustion gases toward the annular space 14 separating the cylindrical body 7 from the boiler 1 and which properly forms a stack for said gases.

The stack 14 is continued upwards between a metal cylindrical body 15 provided exteriorly with a horizontal flange 16 secured by screws 17 on the horizontal portion of angular ring 9. A cylindrical tank 18 is concentrically spaced from the cylindrical body 15 and supported at the middle portion of its lower base by a screw shank 19 screwed at its upper end in a threaded socket 20 formed beneath said base and screwed at its lower end in a threaded socket 21 similarly formed at the middle portion of the top of boiler 1.

The cylindrical body 7 surrounding the boiler 1 is supported by a series of casting stands 22 to which it is secured by screws 23 and which stands are adapted to rest on any desired supporting surface like that of a table. The upper cylindrical body 15 has its top opening closed by a cover 25 in the shape of a removable dome fitting within said opening and provided with a horizontal flange 25 to rest on the upper edge of said body 15. The latter body has near its upper edge a series of holes 26 serving as outlets for the combustion gases from burner 3 after they have heated the water 27 in the boiler 1 upon circulating through vertical flues 2 and through the annular space 14 between the boiler 1 and the cylindrical body 7 and after they have also heated, though in smaller degree, the water 28 contained in tank 18 upon circulating through the annular space 29 separating the tank 18 from the cylindrical body 15. The tank 18 is automatically fed with water through a tube 30 connecting the inner space of same with the inner space of a smaller tank 31 supported by screws 32 on a side of the peripherial wall of body 15 and which tank is provided with an inlet cock 33 mounted on the inner end of a water pipe 34 and automatically operable by a float 35.

The boiler 1 is fed with water through a tube 36 which passes through the body 7 and through the wall of the boiler and ends outside in a valve box 37 having a valve 38 and supporting a hand feed-cup 39 provided with a cover 40. The steam produced in the boiler 1 is utilized for heating three funnel-shaped water-bath devices mounted in front of the body 7 and each supported thereon by a horizontal tube 41 passing through the body 7 and through the peripherial wall of the boiler 1. Each tube 41 is threadedly connected outside the body 7 with an elbowed tubular coupling 43 to the upper end of which is fitted the lower opening 44 of a heater formed of two sections, viz, an open upper section 45 of cylindrical shape and a lower section 46 of inverted-cone shape closed on top by a horizontal plate 47 serving as a bottom for the upper section 45. The latter section serves to receive the lower cylindrical section 48 of a water-bath tank which has an upper cylindrical section 49 of greater diameter than the lower section 48 and is joined thereto by a horizontal seat flange 50 through which it rests on the upper edge of the upper section 45 of the heater.

The lower section 48 of the bath tank is filled with water 51 and on the horizontal flange 50 is placed a perforated plate 52 on which is positioned a coffee-pot 52' or similar device desired to be heated by the water-bath. The lower space of the funnel 46 forms a steam chamber which is in communication with the atmosphere through a thin tube 53 supported in the vertical branch of the elbow coupling 43 to approach the upper plate 47 and opening at its lower end in the inner cavity of a cylindrical extension 55 projecting downwards from the elbow 43. To the three elbow couplings 43 are threadedly secured three of the branches of a four-branch tube 57, the fourth branch of this tube being connected to another tube 58 provided with a valve 59 and which freely opens into the atmosphere.

The boiler 1 is also provided with a level indicator 60 mounted outside the body 7 in communication with the interior of the boiler by a tube 61 passing through the body 7.

The steam produced in boiler 1 is also used to serve two devices for heating a liquid such as milk and mounted at each side of the cylindrical body 15, each heater being supported on the body 7 by a horizontal tube 62 passing through the body 7 and through a hole 63 formed in the periphery of the boiler 1. The tube 62 is connected with a union 64 carrying a valve 65 and with a short vertical tube 66 which supports the hollow inverted-cone shaped body 67 forming part of a cylindrical supporting base 68. Each heater consists of a metal cylindrical body 69 open below and integral at its upper edge with a metal frustro-conical tank 70 tapered downwards to form an annular tapering space 71. The bottom 70' of the tank is above the lower edge of the cylindrical body 69 to form a chamber 72 beneath said bottom, the inner tank 70 being provided with a removable cover 73 and an elbow discharge tube 74 projecting to the outside of the cylindrical body 69 through a hole in the latter and provided with an outer valve 75.

The cylindrical body 69 is supported on the cylindrical base 68 within which it fits and rests on a horizontal flange 76 projecting from the cylindrical body, the latter being provided with a vertical slot 77 through which is adapted to pass the horizontal branch of the elbow discharge tube 74 of tank 70.

The frustro-conical body 67 has at its lower apex an opening 78 in which the vertical tube 66 is threadedly connected, and its steam space 79 communicates with the chamber 72 below the bottom 70' of the tank 70 through a U-shaped tube 80 provided with a valve 81 and tube 82 entering horizontally into said chamber 72 beneath the lower edge of the cylindrical body 69.

The cylindrical body 69 has near its upper edge a series of holes 83 serving as outlets for the steam ascending through the annular space 71, the discharge of steam through holes 83 serving as an indication for the operator to nearly close the valves 64 and 81 and to leave them open to the minimum necessary to maintain a suitable temperature in the tank 70.

The steam from boiler 1 is further used to further heat rapidly the preheated water contained in the tank 18 which may be necessary for a straining operation, said water being automatically supplied to the strainer by means of the following arrangement. To the rear portion of the wall of the cylindrical body 15 is secured by screws 75' the horizontal plate 76' having a downward annular flange 77' at one side of which the plate 79'' is rotatably mounted. It is supported on a pivot 78' in lug 77'' projecting from the plate 77'. Oppositely to said lug 79' projects from the same upper edge the handle 81' adapted to swing the strainer to one side when it is desired to empty it or to re-fill it with infusion material such as ground coffee, etc.

The body 80' carries at its bottom an inverted conical cavity 82' directly above the discharge opening 83' and said cavity 82' is covered by an inverted glass hollow cone 84 to prevent contact of the hot infusion with the metal. Within the cylindrical body 80' is placed the vessel 85, preferably made of aluminum, which is provided at its upper edge with a horizontal flange 86 which engages the upper edge of the body 80' and the bottom of the vessel has perforations 87 to permit passage of the infusion formed by water and the coffee or other vegetable 88 which is placed within the vessel 85. The material is covered by a perforated plate 89 provided with a handle 90 to facilitate its removal or placing it in position. The plate 76' has at its middle portion a raised bushing 91 which has an inner threaded surface in which is rotatably mounted a screw 92 carrying the injection tube 93 on whose lower end is fixed the cover 94 adapted to fit the upper edge of the vessel 85. A collar 95 on the screw 92 serves for fixing the tube 93 by means of a set screw 96. The bushing 91, the screw 92 and the collar 95 are inclosed within a bell-shape cover 97 through which passes a horizontal bar 98 provided with a handle 99 to raise or lower the screw 92 with the cover 94, when required.

The tube 93 is provided at its upper end with a valve 100 in communication with a descending tube 101 which through a branch tube 102 provided with a valve 103 is in communication with the interior of the tank 18. Tube 101 extends to the base 104 of a steam heater situated in vertical alignment beneath the strainer, as seen in Fig. 4 of the drawings. Said supporting base 104 is made of metal and has a central cavity 105 closed on top by a thin metal plate 106 of upwardly convex shape to penetrate into the inner space of a tank 107 closed on top and open below and adapted to contain the preheated water received from tank 18 through the lower section of the tube 101, if the valve 103 is opened. Tube 101 is connected through an elbow 108 with a recess 109 formed in the upper surface of the base 104.

The tank 107 rests at its lower edge on a packing ring 110 lodged in a recess 111 suitably formed in the upper face of the base 104, and is firmly retained in this position by means of a clamp 112 depending from two journals in diametral alignment. The journals are formed by screws 113 inserted in sockets 114 on the wall of tank 107, the clamp 112 having a central boss 115 in whose interior is threadedly received a screw 116 provided with a lower handle 117. The point at the upper end of screw 116 presses against the base of a tubular socket 118 whose upper end is threadedly coupled within the lower opening 119 formed at the central portion of the base 104 and which socket is integral with a horizontal tube 120 extending to the steam space of the boiler 1 and serving as a support for the base 104 and the tank 107 through the socket 118.

To the base 104 opposite the tube 101 is secured an elbow tube 121 whose upper end within the tank 107 is connected to the bottom of the housing of a thermic control device 122 which may be of a volatile liquid type. The lower end of said tube 121 is connected to a tube 123 carrying a valve 124 and is secured to the upper section of the tube 101 at a point 125 above the branch 102. The tank 107 has a level sight window 126.

The operation of the steam heater device 104 in association with the strainer is as follows: The valve 103 is opened to allow the tank 107 to be filled to about two thirds of its capacity with hot water from the tank 18 with the valves 100 and 124 open. After the tank 107 is supplied with sufficient water, the valve 103 is closed. As the base 104 is being continuously heated by the steam from the steam space of the boiler 1, it is maintained at such a temperature that the water 127 contained in the tank 107 attains in very short time the necessary temperature for the straining operation. When it has reached this temperature as determined by the thermic control device 122, the top 122' of the bellows expanded by the heated volatile liquid contained therein, closes the inlet of tube 121 and therefore shuts off the egress of air and steam. The pressure of the steam formed within the tank 107 will be such that it will force the water 127 through tube 101 and tube 93 against the cover 89 resting on the coffee or other vegetable material contained in vessel 85, an infusion being thus formed which discharges through the lower opening of the body 80, to be suitably received in a pot 128 placed on the tank 107.

Figure 2:
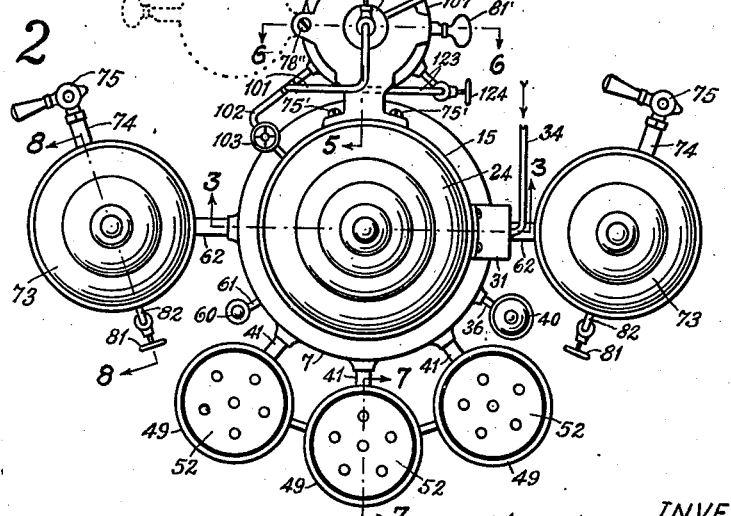
Fig. 2 is a top plan view of same, showing the infusion strainer positioned behind the steam generator.

When the tank 107 is emptied, it can be refilled whenever a new infusion is to be prepared, by simply opening the valve 103. In the interval between two operations the coffee or other vegetable material will be removed from the strainer after the latter has been swung to one side as indicated by dotted lines in Fig. 2, and the strainer will be charged with a fresh supply of infusion material, whereafter it is placed in its normal position beneath the stationary plate 76 by means of the handle 81'.

It is obvious that changes may be made in the shape and construction details of the boiler and the heater devices above described, without thereby altering the essential character of the invention, which is such as claimed hereinafter.

What I claim is:

Infusion apparatus for coffee making devices or the like, comprising in combination with a boiler connected with a source of water, a strainer supported on the outside of the boiler, a steam heater closed at its top and having an opening at its bottom, a tube supporting the steam heater on the outside of the boiler and connecting the bottom opening of the steam heater with the steam space of the boiler, a tank closed on top and open at the bottom and resting at its lower opening on the closed top of the steam heater, a packing interposed between the lower edge of the tank and the top of the steam heater, means for resiliently forcing the tank downwardly against the steam heater, a hot water injection tube connecting the tank with the strainer, a branch tube extending from the injection tube, a valve in said branch between the injection tube and the source of water, and thermostatic control means within the tank adapted to interrupt the discharge of air and steam from the tank when the water in the tank has reached a certain temperature, whereby the pressure attained by the steam generated in the tank automatically forces the hot water from the tank into the strainer.

JUAN HERNANDEZ HERRERA.